Nov. 8, 1927.  1,648,359

A. NEWMAN

MEANS FOR MAKING FRUIT PUDDING AND THE LIKE

Filed Sept. 5, 1922

INVENTOR
ARTHUR NEWMAN

BY
HIS ATTORNEY.

Patented Nov. 8, 1927.

1,648,359

UNITED STATES PATENT OFFICE.

ARTHUR NEWMAN, OF LOS ANGELES, CALIFORNIA.

MEANS FOR MAKING FRUIT PUDDING AND THE LIKE.

Application filed September 5, 1922. Serial No. 586,147.

My invention relates to fruit puddings and the like and has for its principal object to provide a tubular article of substantial thickness when baked, with an open center, adapted to be filled with hard sauce or other tasty filler, to be eaten with the body or container, and which can, if desired, be sliced after the filler has been placed therein, to be served in slices or rings with the sauce in the middle thereof.

In order to accomplish this, I have provided a special utensil for cooking the article so as to provide the open center and yet have the article wholly covered or enclosed while it is being cooked.

In order to fully explain my invention, I have shown one form of the utensil and the finished product on the accompanying sheet of drawings, which I will now describe.

Figure 1:
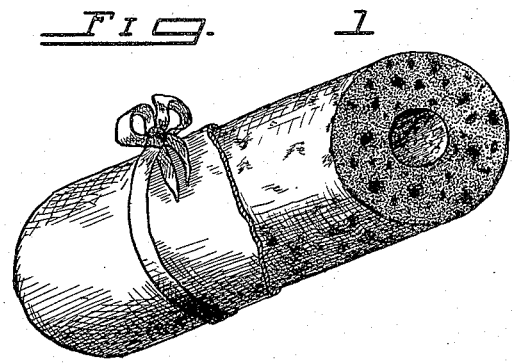
Figure 1 is a perspective view of a fruit pudding, partially wrapped, for sale and showing the form thereof, where the wrapper is removed.
Figure 2:
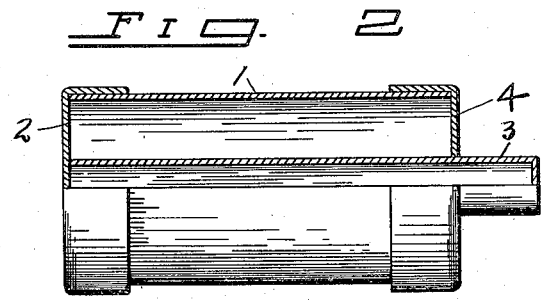
Figure 2 is a side elevation, partly in section of my utensil, as assembled.
Figure 3:
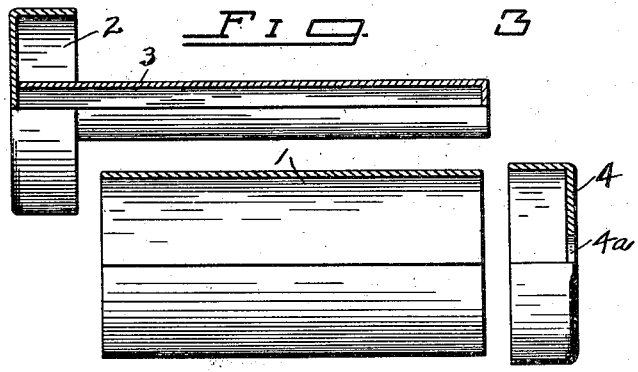
Figure 3 shows the three parts of the utensil separated, and partly in section.

The utensil comprises a cylindrical portion 1, with a cap-like portion, 2, having a central tubular element, 3, secured centrally thereto, and adapted to extend centrally through and beyond the opposite end of the cylindrical member 1, when said cap-like member 2 is put in place, as indicated in Fig. 2. A second cap member, 4, with a central opening, 4ª, is provided for the opposite end of the cylindrical member, 1, adapted to fit over the tubular element 3, when the parts are assembled, as shown in Fig. 2. Parts 1 and 2 are assembled, the material to be cooked is placed therein, around the tubular element 3, and the cover or cap 4, is placed over the opposite end and the article is ready for the cooking, whether it be steaming or baking. The projecting end of the tubular element 3 provides for partial removal of the cap 4 without misplacing said tubular element 3, as under expansion of the contents, and it also serves as handle with which to lift the article. The utensil is preferably first treated with grease or oil of a suitable character so that when the article is cooked, the parts of the utensil can be removed without damage to the form of the cooked article, and this can be readily done by slightly turning the parts in removing them.

The article, when removed, can then be filled with hard sauce, or other desired filler of an edible character and wrapped for the market, complete and ready for the table whenever purchased and sliced.

It will be evident that many different kinds of articles can be cooked in the utensil and removed and filled with a desirable edible, whether of a permanent form or only temporary, such as ice cream. So far as I am aware, I am the first to provide a fruit pudding, or similar article in a thick tubular form, with the hard sauce filling the center thereof for the purpose of being sliced for service, and while I am aware that changes in details can be made in my invention as here shown and described, I do not limit my invention to this showing, except as I may be limited by the hereto appended claims.

I claim:

1. Means for making fruit pudding and the like comprising a cylindrical member open at both ends, a cap for one end having a tubular member of small diameter secured centrally thereto to project through said cylindrical member when said cap is in place thereon, and a cap for the other end of said cylindrical member having a central opening to receive the free end of said tubular member.

2. A utensil of the character shown and described including in combination a cylindrical member open at both ends, a cap for each end, one of said caps having a central opening and the other cap having secured therein, centrally thereof a small tubular member longer than said cylindrical member, whereby when said caps are placed upon said cylindrical member said tubular member at one end extends through said central opening of the one cap.

Signed at Los Angeles, California, this 28th day of August, 1922.

ARTHUR NEWMAN.